US011110515B2

(12) United States Patent
Boulos et al.

(10) Patent No.: US 11,110,515 B2
(45) Date of Patent: Sep. 7, 2021

(54) PROCESS AND APPARATUS FOR PRODUCING POWDER PARTICLES BY ATOMIZATION OF A FEED MATERIAL IN THE FORM OF AN ELONGATED MEMBER

(71) Applicant: TEKNA PLASMA SYSTEMS INC., Sherbrooke (CA)

(72) Inventors: Maher I. Boulos, Sherbrooke (CA); Jerzy W. Jurewicz, Sherbrooke (CA); Alexandre Auger, St-Adrien de Ham (CA)

(73) Assignee: TEKNA PLASMA SYSTEMS INC.

( * ) Notice: Subject to any disclaimer, the term of this patent is extended or adjusted under 35 U.S.C. 154(b) by 36 days.

(21) Appl. No.: 16/784,667

(22) Filed: Feb. 7, 2020

(65) Prior Publication Data
US 2020/0171580 A1 Jun. 4, 2020

Related U.S. Application Data

(60) Continuation of application No. 15/666,655, filed on Aug. 2, 2017, now Pat. No. 10,688,564, which is a
(Continued)

(51) Int. Cl.
*B22F 9/14* (2006.01)
*H05H 1/42* (2006.01)
(Continued)

(52) U.S. Cl.
CPC ...... *B22F 9/14* (2013.01); *B01J 2/02* (2013.01); *B33Y 70/00* (2014.12); *H05H 1/38* (2013.01);
(Continued)

(58) Field of Classification Search
None
See application file for complete search history.

(56) References Cited

U.S. PATENT DOCUMENTS 2,659,623 A 11/1953 Wilson
3,041,672 A 7/1962 Lyle
(Continued)

FOREIGN PATENT DOCUMENTS

CA 2183290 2/1997
CA 2383861 3/2001
(Continued)

OTHER PUBLICATIONS

Vardavoulias, Pyrogenesis S.A., "Injection Moulding of Titanium Powers for Biomedical Applications", BIOTIP, Oct. 2008, pp. 1-22.
(Continued)

*Primary Examiner* — George Wyszomierski
(74) *Attorney, Agent, or Firm* — K&L Gates LLP

(57) ABSTRACT

The present disclosure relates to a process and an apparatus for producing powder particles by atomization of a feed material in the form of an elongated member such as a wire, a rod or a filled tube. The feed material is introduced in a plasma torch. A forward portion of the feed material is moved from the plasma torch into an atomization nozzle of the plasma torch. A forward end of the feed material is surface melted by exposure to one or more plasma jets formed in the atomization nozzle. The one or more plasma jets being includes an annular plasma jet, a plurality of converging plasma jets, or a combination of an annular plasma jet with a plurality of converging plasma jets. Powder particles obtained using the process and apparatus are also described.

23 Claims, 11 Drawing Sheets

Related U.S. Application Data continuation of application No. 15/394,417, filed on Dec. 29, 2016, now Pat. No. 9,751,129, which is a division of application No. 15/040,168, filed on Feb. 10, 2016, now Pat. No. 9,718,131, which is a continuation of application No. PCT/CA2015/050174, filed on Mar. 9, 2015.

(60) Provisional application No. 62/076,150, filed on Nov. 6, 2014, provisional application No. 61/950,915, filed on Mar. 11, 2014.

(51) Int. Cl.
- *B01J 2/02* (2006.01)
- *H05H 1/38* (2006.01)
- *B33Y 70/00* (2020.01)

(52) U.S. Cl.
CPC ........... *H05H 1/42* (2013.01); *B22F 2202/13* (2013.01); *B22F 2999/00* (2013.01)

(56) References Cited

U.S. PATENT DOCUMENTS

| | | |
|---|---|---|
| 3,239,648 A | 3/1966 | Syrigos |
| 3,543,810 A | 12/1970 | Scheller |
| 3,646,176 A | 2/1972 | Ayers |
| 3,891,824 A | 6/1975 | Essers et al. |
| 3,901,441 A | 8/1975 | Kasagi |
| 3,931,375 A | 1/1976 | Blucher et al. |
| 4,080,126 A | 3/1978 | Clark et al. |
| 4,174,477 A | 11/1979 | Essers et al. |
| 4,177,026 A | 12/1979 | Honnorat et al. |
| 4,181,256 A | 1/1980 | Kasagi |
| 4,374,075 A | 2/1983 | Yolton et al. |
| 4,447,703 A | 5/1984 | Stol |
| 4,595,600 A | 6/1986 | Keeven et al. |
| 4,667,083 A | 5/1987 | Stol |
| 4,788,394 A | 11/1988 | Vanneste et al. |
| 4,928,879 A | 5/1990 | Rotolico |
| 4,958,057 A | 9/1990 | Shiraishi et al. |
| 4,982,410 A | 1/1991 | Mustoe et al. |
| 5,147,448 A | 9/1992 | Roberts et al. |
| 5,200,595 A | 4/1993 | Boulos et al. |
| 5,233,155 A | 8/1993 | Frind |
| 5,277,705 A | 1/1994 | Anderson et al. |
| 5,284,329 A | 2/1994 | Hohman et al. |
| 5,340,377 A | 8/1994 | Accary et al. |
| 5,340,961 A | 8/1994 | Bebber |
| 5,368,657 A | 11/1994 | Anderson et al. |
| 5,372,629 A | 12/1994 | Anderson et al. |
| 5,442,153 A | 8/1995 | Marantz et al. |
| 5,480,470 A | 1/1996 | Miller et al. |
| 5,560,844 A | 10/1996 | Boulos et al. |
| 5,609,921 A | 3/1997 | Gitzhofer et al. |
| 5,707,419 A | 1/1998 | Tsantrizos et al. |
| 5,808,270 A | 9/1998 | Marantz et al. |
| 5,874,134 A | 2/1999 | Rao et al. |
| 5,932,346 A | 8/1999 | Kent et al. |
| 5,935,461 A | 8/1999 | Witherspoon et al. |
| 5,938,944 A | 8/1999 | Baughman et al. |
| 5,939,151 A | 8/1999 | Prichard et al. |
| 5,961,772 A | 10/1999 | Selwyn |
| 6,142,382 A | 11/2000 | Ting et al. |
| 6,162,382 A | 12/2000 | Kent et al. |
| 6,365,867 B1 | 4/2002 | Hooper |
| 6,398,125 B1 | 6/2002 | Liu et al. |
| 6,693,253 B2 | 2/2004 | Boulos et al. |
| 6,693,264 B2 | 2/2004 | Anderhuber et al. |
| 6,915,964 B2 | 7/2005 | Tapphorn et al. |
| 6,919,527 B2 | 7/2005 | Boulos et al. |
| 7,022,155 B2 | 4/2006 | Deegan et al. |
| 9,380,693 B2 | 6/2016 | Boulos et al. |
| 9,433,073 B2 | 8/2016 | Cheung et al. |
| 9,718,131 B2 | 8/2017 | Boulos et al. |
| 9,751,129 B2 | 9/2017 | Boulos et al. |
| 9,981,315 B2 | 5/2018 | Rieken et al. |
| 10,688,564 B2* | 6/2020 | Boulos ..................... H05H 1/42 |
| 2002/0168466 A1 | 11/2002 | Tapphorn et al. |
| 2003/0080097 A1 | 5/2003 | Boulos et al. |
| 2003/0152699 A1 | 8/2003 | Someno et al. |
| 2005/0017646 A1 | 1/2005 | Boulos et al. |
| 2005/0118090 A1 | 6/2005 | Schaffer et al. |
| 2007/0026158 A1 | 2/2007 | Molz et al. |
| 2007/0062332 A1* | 3/2007 | Jones ..................... B22F 9/082 |
| | | 75/338 |
| 2007/0292340 A1 | 12/2007 | Plischke et al. |
| 2008/0179034 A1* | 7/2008 | Forbes Jones ........... H05H 1/48 |
| | | 164/46 |
| 2010/0059493 A1 | 3/2010 | McAninch |
| 2010/0200808 A1 | 8/2010 | Hafiz et al. |
| 2012/0160813 A1 | 6/2012 | Kowalsky et al. |
| 2012/0235203 A1 | 9/2012 | Mukherjee et al. |
| 2012/0261390 A1 | 10/2012 | Boulos et al. |
| 2013/0011569 A1 | 1/2013 | Schein et al. |
| 2013/0040067 A1* | 2/2013 | Kennedy ................ B22D 30/00 |
| | | 427/474 |
| 2014/0202286 A1 | 7/2014 | Yokoyama et al. |
| 2015/0274566 A1 | 10/2015 | Boughton |
| 2016/0347641 A1 | 12/2016 | Boughton |
| 2018/0214956 A1* | 8/2018 | Larouche ............... C22C 1/0416 |

FOREIGN PATENT DOCUMENTS

| | | |
|---|---|---|
| CN | 1559696 | 1/2005 |
| CN | 202447672 | 9/2012 |
| CN | 103769594 | 5/2014 |
| DE | 4102101 | 7/1992 |
| GB | 1338866 | 11/1973 |
| JP | S5331820 | 9/1978 |
| JP | 05093213 | 4/1993 |
| JP | H05508053 | 11/1993 |
| JP | 2010/018825 | 1/2010 |
| KR | 20050034310 | 4/2005 |
| KR | 10-2005-0108705 | 11/2005 |
| RU | 101395 | 1/2011 |
| RU | 2457925 | 8/2012 |
| SU | 288490 | 12/1970 |
| WO | 92/19086 | 10/1992 |
| WO | 1993/006256 | 4/1993 |
| WO | 2011/054113 | 5/2011 |
| WO | 2012/023684 | 2/2012 |
| WO | 2012/103639 | 8/2012 |
| WO | 2012/157733 | 11/2012 |
| WO | 2016/191854 | 12/2016 |
| WO | 2017/011900 | 1/2017 |
| WO | 2017177315 | 10/2017 |

OTHER PUBLICATIONS

Anderson et al., "Atomization and Powder Processing of High Temperature Ferritic Stainless Steel", Iowa State University, Ames Laboratory, 10 pages.

Reiken, "Gas atomized precursor alloy powder for oxide dispersion strengthened ferritic stainless steel", Iowas State University Capstones, Theses and Dissertations, 01459, (2011) 363 pages.

Sumper et al., "Electrical Energy Efficiency: Technologies and Applications, First Edition", Chapter 10 Industrial Heating Processes, 2012 John Wiley & Sons, Ltd., pp. 296-334.

Notice of Allowance in CA 3,039,695 dated Sep. 16, 2019 (1 pg.).
Notice of Allowance in CA 3,047,663 dated Nov. 8, 2019 (1 pg.).
Notice of Allowance in CA 3,030,794 dated Dec. 16, 2019 (1 pg.).
Notice of Allowance in CA 2,912,282 dated Dec. 11, 2018 (1 pg.).
Examiner's Report in CA 3,030,794 dated Jul. 29, 2019 (5 pgs.).
Examiner's Report in CA 3,039,695 dated May 9, 2019 (5 pgs.).
Examiner's Report in CA 3,039,695 dated Jul. 19, 2019 (5 pgs.).
Examiner's Report in CA 3,047,663 dated Jul. 26, 2019 (7 pgs.).
Examiner's Report in CA 3,030,794 dated Jul. 12, 2019 (4 pgs.).
Examiner's Report in CA 3,030,794 dated May 24, 2019 (5 pgs.).
Examiner's Report in CA 3,030,794 dated Feb. 20, 2019 (4 pgs.).
Examiner's Report in CA 3,030,794 dated Oct. 18, 2019 (3 pgs.).

(56) References Cited

OTHER PUBLICATIONS

ALD Vacuum Technologies GmbH, Ceramic-Free Metal Powder Production for Reactive and Refratory Metals, MetaCom/Eiga_e/ 05.11, 2011, 4 pgs.
Boulos, Thermal Plasma Processing, IEEE Translations on Plasma Science, [1991], vol. 19, No. 6, pp. 1078-1089.
Fauchais et al., "Thermal Sprayed Coatings Used Against Corrosion and Corrosive Wear," Advanced Plasma Spray Applications, Dr. Hamid Jazi (Ed.), ISBN:978-51-0349-3, pp. 3-39, 2012.
Franz et al., "Recent Advances of Titanium Alloy Powder Production by Ceramic-free Inert Gas Atomization," Proc Titanium, International Titanium Association, Las Vegas, NV, USA, 2008, 14 pgs.
Hohmann et al., "Experience on Powder Production by Crucible Free Induction Drip Melting Combined with Inert Gas Atomizing," Advances in Power Metallurgy, Metal Powder Industries Federation, N.Y., 1989, pp. 153-160.
NASA Tech Brief, Lewis Research Center, "Advances in Induction-Heated Plasma Torch Technology", May 1972, 2 pages.
Pleier et al., "EIGA—An Innovative Production Method for Metal Powder from Reactive and Refractory Alloys," ALD Vacuum Technologies, 2004, 7 pgs.
Raymor AP&C: Leading the way with plasma atomised TI spherical powders for MIM, Power Injection Moulding International, 5(4):55-57, Dec. 2011.
Soucy et al., "Heat and Mass Transfer During in-Flight Nitridation of Molybdenum Disilicide Power in an Induction Plasma Reactor," Materials Science and Engineering A300, pp. 226-234, 2001.

PCT Written Opinion of the International Searching Authority for International Application No. PCT/CA2015/050174, date of completion: May 20, 2015, 4 pgs.
Communication from CIPO dated Jan. 25, 2017 referencing Supplemental Prior Art Submission Under S.34.1(1) of the Patent Act dated Jan. 18, 2017 for Canadian Patent Application No. 2,912,282, 4 pages.
Supplemental Prior Art Submission Under 34.1(1) of the Patent Act for Canadian Patent Application No. 2,912,282, Apr. 19, 2017, 14 pgs.
Third Party Submission Under 37 CFR 1.290 for U.S. Appl. No. 15/040,168, dated Oct. 26, 2016, 18 pages.
Search Report for Russian Application No. 2016139600/02 dated Nov. 1, 2018 (2 pages).
Ishigaki et al., "Synthesis of functional TiO2-based nanoparticles in radio frequency induction thermal plasma", Pure Appl. Chem., vol. 80, No. 9, pp. 1971-1979, 2008 (9 pages).
Li et al., "Control of particle size and phase formation of TiO2 nanoparticles synthesized in RF inductions plasma", Journal of Physics D: Applied Physics, vol. 40, No. 8 (4 pages).
Tanaka et al., "Influence of coil current modulation on TiO2 nanoparticle synthesis using pulse-modulated induction thermal plasmas", Thin Solid Films, 2011 (23 pages).
NASA Contractor Report, CR-1764, Curved Permeable Wall Induction Torch Tests, published on Mar. 30, 1971, 49 pages.

* cited by examiner

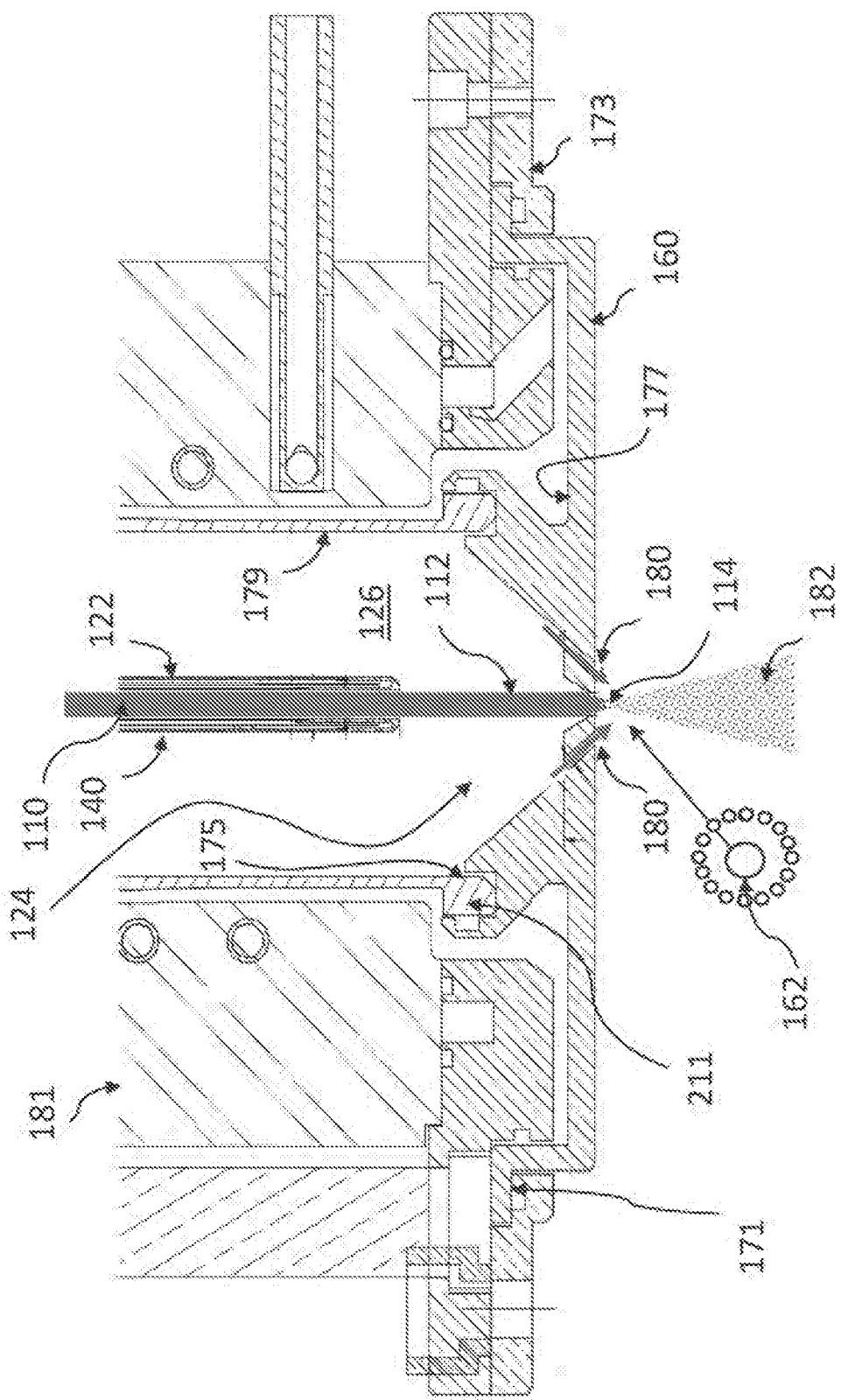

PROCESS AND APPARATUS FOR PRODUCING POWDER PARTICLES BY ATOMIZATION OF A FEED MATERIAL IN THE FORM OF AN ELONGATED MEMBER

CROSS REFERENCE TO RELATED APPLICATIONS

This application is a continuation of U.S. application Ser. No. 15/666,655, filed on Aug. 2, 2017, now U.S. Pat. No. 10,688,564, which is a continuation of U.S. patent application Ser. No. 15/394,417, filed on Dec. 29, 2016, now U.S. Pat. No. 9,751,129, which is a divisional of U.S. patent application Ser. No. 15/040,168, filed on Feb. 10, 2016, now U.S. Pat. No. 9,718,131, which is a continuation of International Application No. PCT/CA2015/050174, filed on Mar. 9, 2015, which claims priority to and benefit of U.S. Provisional Application No. 61/950,915, filed on Mar. 11, 2014 and U.S. Provisional Application No. 62/076,150, filed on Nov. 6, 2014, the entire disclosures of each of which are hereby incorporated by reference.

TECHNICAL FIELD

The present disclosure relates to the field of materials processing. More specifically, the present disclosure relates to a process and to an apparatus for producing powder particles by atomization of a feed material in the form of an elongated member. Powder particles produced using the disclosed process and apparatus are also disclosed.

BACKGROUND

With the growing interest in rapid prototyping and manufacturing, commonly known as additive manufacturing or 3-D printing, a number of techniques have been developed for the production of dense spherical powders, which are useful for such technologies. The success of additive manufacturing and 3-D printing depends in a large extent on the availability of materials usable for parts manufacturing. Such materials need to be provided in the form of highly pure, fine (e.g. diameter less than 150 µm), dense, spherical, and free-flowing powders that have well-defined particle size distributions. Conventional melt atomization techniques such as gas, liquid and rotating disc atomization are unable to produce such high quality powders.

More recent techniques avoid the use of crucible melting, which is often responsible for material contamination. These recent techniques provide spherical, free-flowing powders.

For example, some plasma atomization processes are based on the use of a plurality of plasma torches producing plasma jets that converge toward an apex. By feeding a material to be atomized in the form of a wire or rod into the apex, the material is melted and atomized by thermal and kinetic energy provided by the plasma jets. It has also been proposed to feed a material to be atomized in the form of a continuous molten stream directed towards an apex where several plasma jets converge. These types of plasma atomization processes are rather delicate and require laborious alignment of at least three plasma torches in order to have at least three plasma jets converging toward the apex. Due to the physical size of such plasma torches, the apex location is bound to be a few centimeters away from an exit point of the plasma jets. This causes a loss of valuable thermal and kinetic energy of the plasma jets before they reach the apex position and impinge on the material. Overall, these processes involve several difficulties in terms of requirements for precise alignment and power adjustment of the torches and for precise setting of the material feed rate.

Other technologies are based on the use of direct induction heating and melting of a wire or rod of a material to be atomized while avoiding contact between the melted material and a crucible. Melt droplets from the rod fall into a gas atomization nozzle system and are atomized using a high flow rate of an appropriate inert gas. A main advantage of these technologies lies in avoiding possible contamination of the material to be atomized by eliminating any possible contact thereof with a ceramic crucible. These technologies are however limited to the atomization of pure metals or alloys. Also, these technologies are complex and require fine adjustment of operating conditions for optimal performance. Furthermore, large amounts of inert atomizing gases are consumed.

Therefore, there is a need for techniques for efficient and economical production of powder particles from a broad range of feed materials.

SUMMARY

According to a first aspect, the present disclosure relates to a process for producing powder particles by atomization of a feed material in the form of an elongated member that includes introducing the feed material in a plasma torch, moving a forward portion of the feed material from the plasma torch into an atomization nozzle of the plasma torch; and surface melting a forward end of the feed material by exposure to one or more plasma jets formed in the atomization nozzle, the one or more plasma jets being selected from an annular plasma jet, a plurality of converging plasma jets, and a combination thereof.

According to another aspect, the present disclosure relates to an apparatus for producing powder particles by atomization of a feed material in the form of an elongated member, comprising a plasma torch including: an injection probe for receiving the feed material; and an atomization nozzle configured to receive a forward portion of the feed material from the injection probe, be supplied with plasma, produce one or more plasma jets, and melt a surface of a forward end of the feed material by exposure to the one or more plasma jets. The one or more plasma jets are selected from an annular plasma jet, a plurality of converging plasma jets, and a combination thereof.

The foregoing and other features will become more apparent upon reading of the following non-restrictive description of illustrative embodiments thereof, given by way of example only with reference to the accompanying drawings. Like numerals represent like features on the various figures of drawings.

BRIEF DESCRIPTION OF THE DRAWINGS

Embodiments of the disclosure will be described by way of example only with reference to the accompanying drawings, in which:

FIG. 2A is a detailed, front elevation view of the plasma torch of FIG. 1, having an atomization nozzle according to an embodiment and a configuration for direct preheating of the elongated member by the plasma;

DETAILED DESCRIPTION

Figure 1:
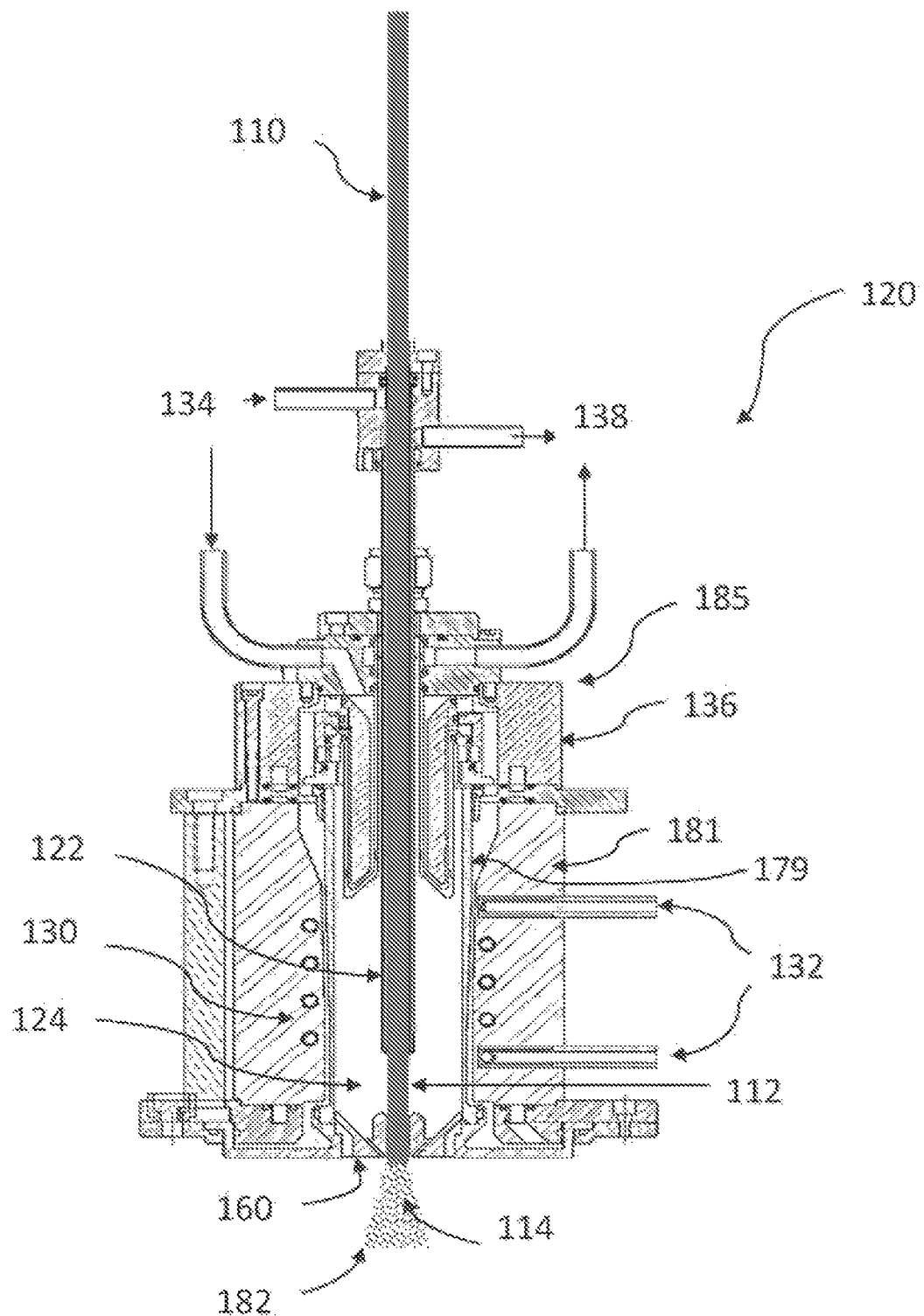
FIG. 1 is a front elevation view of a plasma torch usable for atomization of feed material in the form of an elongated member such as, as non-limitative examples, a wire, rod or filled tube.

Generally speaking, the present disclosure addresses one or more of the problems of efficiently and economically producing powder particles from a broad range of feed materials.

More particularly, the present disclosure describes a plasma atomization process and an apparatus therefor, usable to produce powder particles from a broad range of feed materials, including for example pure metals, alloys, ceramics and composites. The disclosed technology may be used in the manufacture of a wide range of dense spherical metal, ceramic or composite powders from a feed material of the same nature in the form of an elongated member such as, as non-limitative examples, a rod, a wire or a filled tube. A powder may be defined as comprising particles with a diameter of less than one (1) millimeter, a fine powder may be defined as comprising of particles of diameter less than 10 micrometers, while an ultrafine powder may be defined as comprising particles of less than one (1) micrometer in diameter.

In a non-limitative embodiment, the plasma torch, which may optionally be an inductively coupled plasma torch, is supplied with the feed material along a central, longitudinal axis thereof. A speed of movement and/or a distance of travel of the feed material in an optional preheating zone of the plasma torch may be controlled to allow the material to heat to a temperature as close as possible to its melting point while avoiding premature melting thereof within the plasma torch. In one embodiment, a forward end of the optionally preheated feed material enters the atomization nozzle to emerge from its downstream side and enter a cooling chamber. Due to its passage in the atomization nozzle, the forward end or tip of the feed material is exposed to a plurality of plasma jets, for example high velocity plasma jets, including, though not limited to, supersonic fine plasma jets. Upon impinging on the feed material, the plasma jets melt its surface and strip out molten material resulting in finely divided, spherical molten droplets of the material entrained with the plasma gas from the atomization nozzle. In another embodiment, the forward end of the optionally preheated feed material is exposed to an annular plasma jet within the atomization nozzle, the annular plasma jet also causing surface melting of the feed material. Resulting droplets are entrained by the plasma gas into the cooling chamber. In both embodiments, the droplets cool down and freeze in-flight within the cooling chamber, forming for example small, solid and dense spherical powder particles. The powder particles can be recovered at the bottom of the cooling chamber, for example in a downstream cyclone or in a filter, depending on their particle size distribution.

In the context of the present disclosure, powder particles obtained using the disclosed process and apparatus may include, without limitation, micron sized particles that may be defined as particles in a range from 1 to 1000 micrometer in diameter.

The following terminology is used throughout the present disclosure:

Powder particle: a grain of particulate matter, including but not limited to micron sized and nanoparticles, Atomization: reduction of a material into particles.

Feed material: a material to be transformed by a process.

Filled tube: feed material provided in the form of a tube, made as non-limitative examples of metal, plastic or any other suitable material, filled with a powder composed of a pure metal, alloys, ceramic material, any other suitable material, or composed of a mixture of materials, so that melting the powder can give rise to the formation of an alloy or composite.

Plasma: a gas in a hot, partially ionized state.

Plasma torch: a device capable of turning a gas into plasma.

Inductively coupled plasma torch: a type of plasma torch using electric current as an energy source to produce electromagnetic induction of the energy into the plasma.

Injection probe: an elongated conduit that may be cooled using a cooling fluid, for insertion or supply of a feed material.

Preheating zone: area in a plasma torch in which feed material is elevated to a temperature below its melting point.

Atomization nozzle: element to produce plasma jets and to allow feed material to transfer from a plasma torch to a cooling chamber.

In-flight freezing: cooling of liquid droplets becoming solid particles while suspended within a gas.

Cooling chamber a container in which in-flight freezing takes place.

Referring now to the drawings, FIG. 1 is a front elevation view of a plasma torch usable for atomization of feed material in the form of an elongated member such as, as non-limitative examples, a wire, rod or filled tube. Obviously, other types of elongated member could potentially be used in the disclosed process and apparatus for atomization of feed material.

Figure 2B:
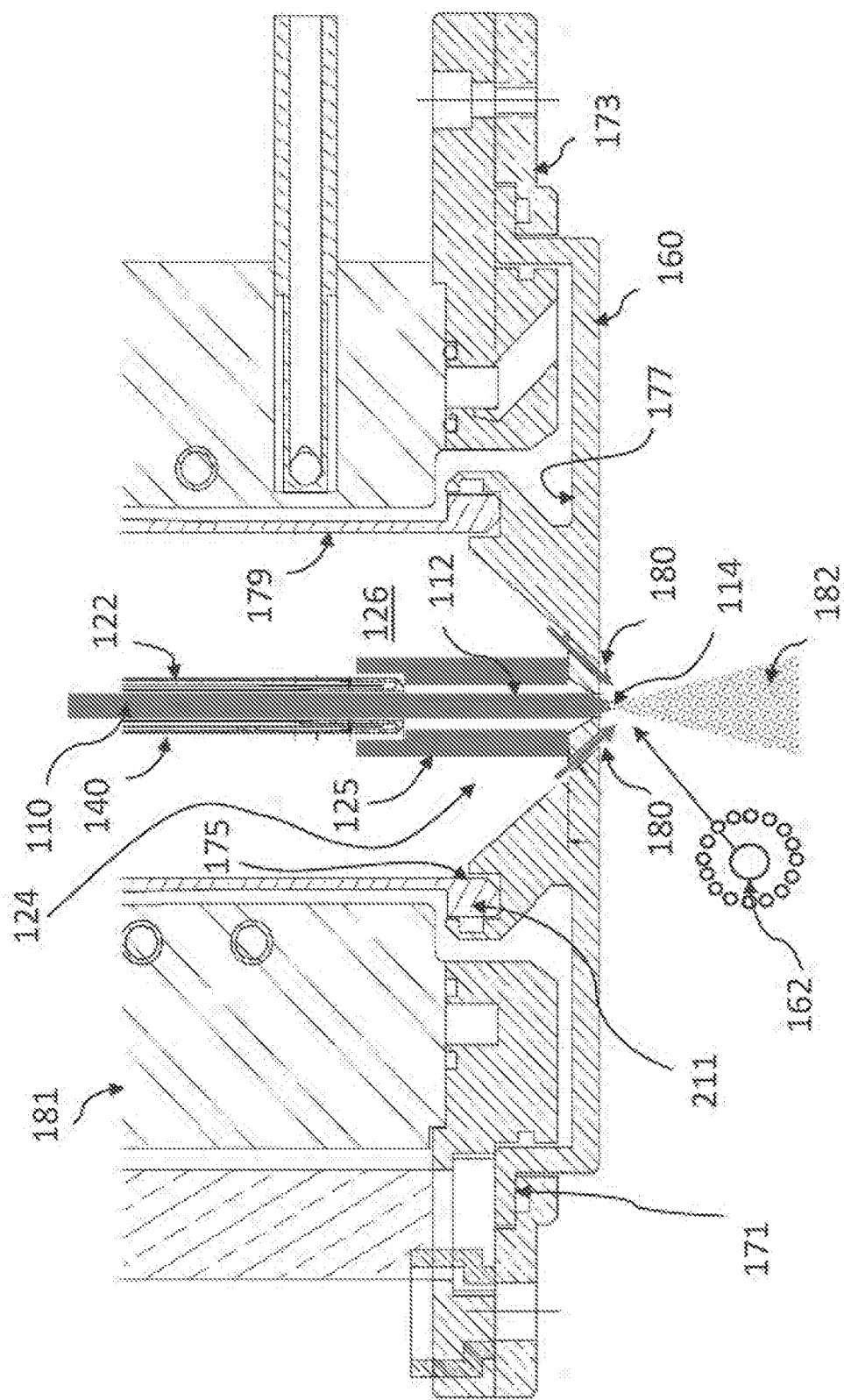
FIG. 2B is a detailed, front elevation view of the plasma torch of FIG. 1, having the atomization nozzle of FIG. 2A and a configuration in which the elongated member is indirectly heated by the plasma through a radiation tube.
Figure 3:
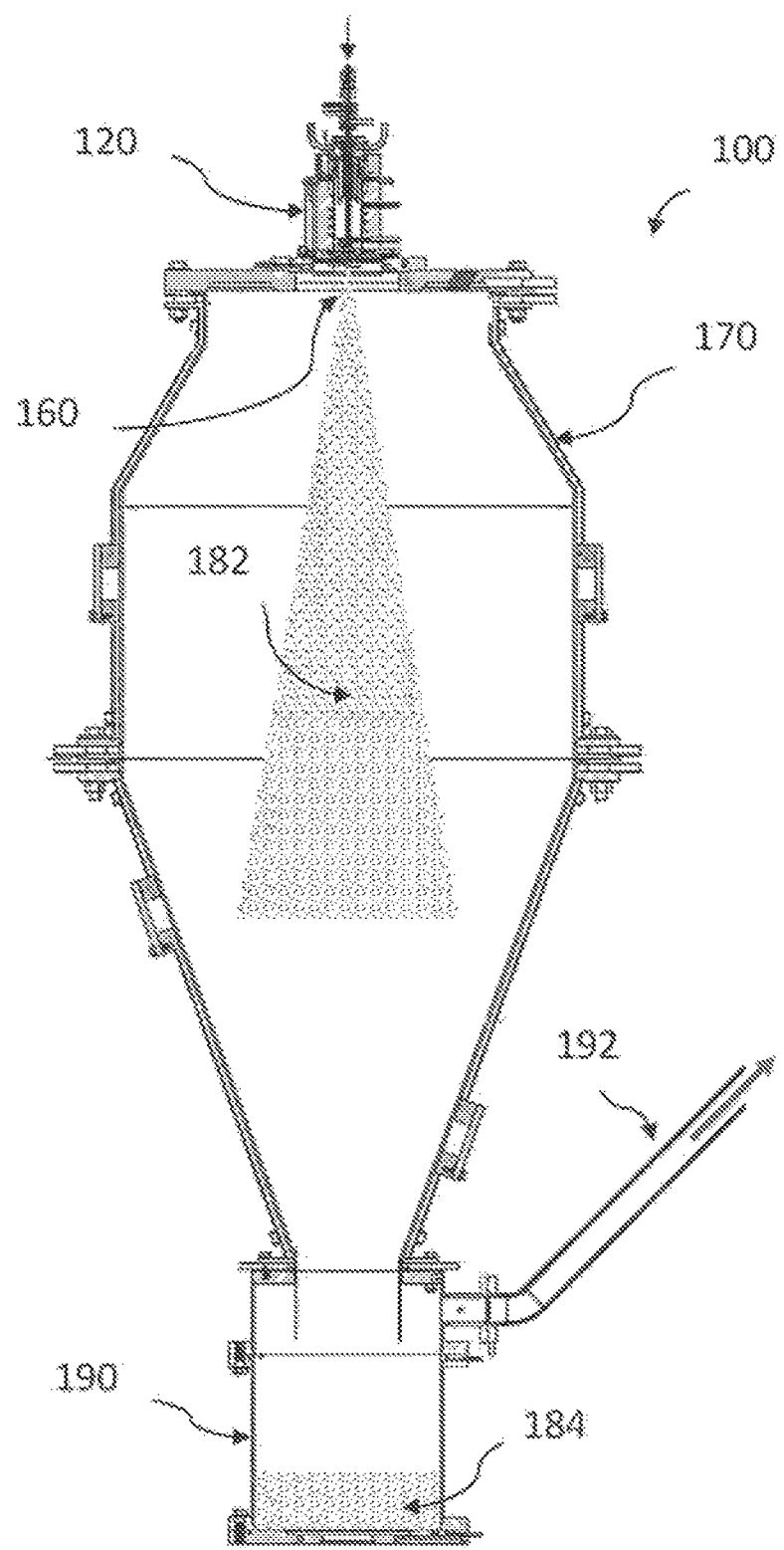
FIG. 3 is a front elevation view of an apparatus for atomization of feed material in the form of an elongated member, the apparatus including the plasma torch of FIG. 1.

FIG. 2A is a detailed, front elevation view of the plasma torch of FIG. 1, having an atomization nozzle according to an embodiment and a configuration for direct preheating of the elongated member by the plasma, while FIG. 2B is a detailed, front elevation view of the plasma torch of FIG. 1, having the atomization nozzle of FIG. 2A and a configuration in which the elongated member is indirectly heated by the plasma through a radiation tube. FIG. 3 is a front elevation view of an apparatus for atomization of feed material in the form of an elongated member, the apparatus including the plasma torch of FIG. 1.

Referring at once to FIGS. 1, 2 and 3, an apparatus 100 for producing powder particles by atomization of a feed material 110 in the form of an elongated member such as, as non-limitative examples, a wire, a rod or a filled tube, comprises a plasma torch 120 producing plasma 126, and a cooling chamber 170. Without limiting the present disclosure, the plasma torch 120 as shown is an inductively coupled plasma torch. Use of other types of plasma torches is also contemplated. The apparatus 100 may further comprise a powder collector 190.

The plasma torch 120 comprises an injection probe 122 in the form of an elongated conduit mounted onto the head 185 coaxial with the inductively coupled plasma torch 120. As illustrated in FIG. 1, the injection probe 122 extends through the head 185 and through the plasma confinement tube 179. The feed material 110 can be inserted in the plasma torch 120 via the injection probe 122 so that it is coaxial with the torch body 181. The feed material 110 may be supplied to the injection probe 122, in continuous manner, by a typical wire, rod or tube feeding mechanism (not shown) for example similar to commercially available units currently used in wire arc welding such as the units commercialized by Miller for MIG/Wire welding, and comprising a first set of wheels operated to control the feed rate of the elongated member to the injection probe 122. The feeding mechanism may be either preceded or followed by two successive sets of straightening wheels to straighten the elongated member within two perpendicular planes. Of course, in some situations, only one set or more of straightening wheels may be required to straighten the elongated member within one plane only or multiple planes. The set(s) of straightening wheels are useful when the feed material is supplied under the form of rolls. In a variant, the feeding mechanism may be adapted to rotate the feed material 110 about a longitudinal axis thereof, specifically about a longitudinal axis of the plasma torch 120.

A preheating zone 124 for preheating a forward portion 112 of the feed material 110, either by direct contact with the plasma 126 as illustrated in FIG. 2A or by radiation heating from a radiation tube 125 surrounding the feed material 110, the radiation tube 125 itself being heated by direct contact with the plasma 126, as illustrated in FIG. 2B. The radiation tube 125 may be made, for example, of refractory material such as graphite, tungsten or hafnium carbide. The plasma torch 120 also comprises an atomization nozzle 160 with a channel through which the forward portion 112 of the feed material 110 from the preheating zone 124 travels to expose a forward end 114 of the feed material 110 to a plurality of plasma jets 180 and atomize the feed material. The channel may comprise a central aperture 162 allowing the forward portion 112 of the feed material 110 to exit the plasma torch 120 and enter the cooling chamber 170, and with radial apertures 166 for producing the plurality of plasma jets 180. The cooling chamber 170 is mounted to the lower end of the plasma torch 120, downstream of the nozzle 160. In the cooling chamber 170, the forward end 114 of the feed material 110 is exposed to the plurality of plasma jets 180.

Still referring to FIGS. 1, 2 and 3 and although other types of plasma torches could eventually be used, the plasma torch 120 is an inductively coupled plasma torch and comprises an outer cylindrical torch body 181, an inner cylindrical plasma confinement tube 179, and at least one induction coil 130 in a coaxial arrangement. The outer cylindrical torch body 181 may be made of moldable composite material, for example a moldable composite ceramic material. The inner cylindrical plasma confinement tube 179 may be made of ceramic material and, as indicated hereinabove, is coaxial with the torch body 181. The at least one induction coil 130 is coaxial with and embedded in the torch body 181 to produce a RF (radio frequency) electromagnetic field whose energy ignites and sustains the plasma 126 confined in the plasma confinement tube 179 including preheating zone 124. The plasma is produced from at least one gas such as argon, helium, hydrogen, oxygen, nitrogen or a combination thereof, supplied within the plasma confinement tube 179 through a head 185 of the inductively coupled plasma torch 120 at the upper end of the torch body 181. RF current is supplied to the induction coil(s) 130 via power leads 132. Water or another cooling fluid is fed via inlets such as 134, flows in cooling channels such as 136, in particular through an annular spacing between the torch body 181 and the plasma confinement tube 179, for cooling the inductively coupled plasma torch. The water or other cooling fluid exits the apparatus 100 via outlets such as 138. Water or other cooling fluid may also flow (a) within a shield 140 of the injection probe 122 and into the induction coil(s) 130 which is (are) then tubular.

Exposure of the forward end 114 of the feed material 110 to the plurality of plasma jets 180 causes local melting of the feed material followed by instantaneous stripping and breakdown of the formed molten layer of feed material into small droplets 182. The droplets 182 fall into the cooling chamber 170, which is sized and configured to allow in-flight freezing of the droplets 182. The droplets 182, when freezing, turn into powder particles 184 collected in the collector 190.

The apparatus 100 of FIG. 3 is configured to let the droplets 182 fall towards the collector 190 by gravity. However, other configurations in which the droplets 182 do not fall vertically, being propelled by a gas or by a vacuum, are also contemplated. In the embodiment of FIG. 3 and in such other configurations, an exit pipe 192 may connect a lower part of the cooling chamber 170 toward a vacuum pumping system (not shown) to withdraw gas from the cooling chamber 170.

The apparatus 100 includes other components such as casings, flanges, bolts, and the like, which are illustrated on FIGS. 1, 2A, 2B, 3, 4, 5 and 6. These elements are believed to be self-explanatory and are not described further herein. The precise configuration of the various components illustrated on these and other Figures do not limit the present disclosure.

Figure 4B:
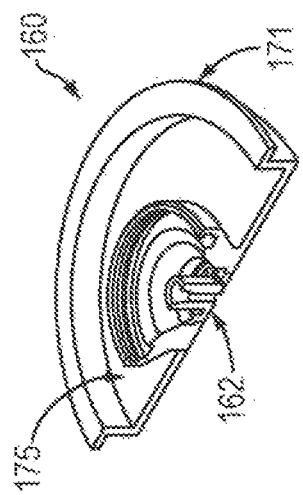
FIG. 4B is a cross-sectional view of the atomization nozzle and support flange of FIG. 4A.
Figure 4E:
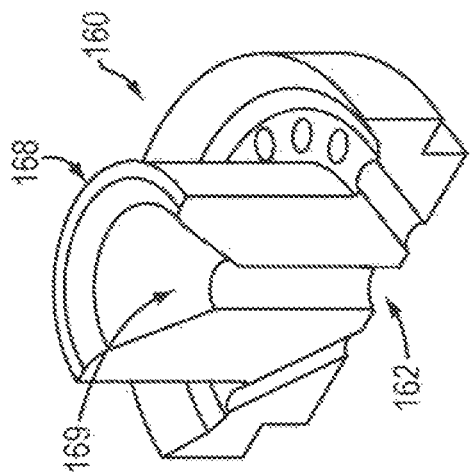
FIG. 4C, FIG. 4D and FIG. 4E are additional top, bottom and perspective views showing details of the atomization nozzle of FIG. 4A, including a central aperture surrounded by radial apertures for producing plasma jets.
Figure 4A:
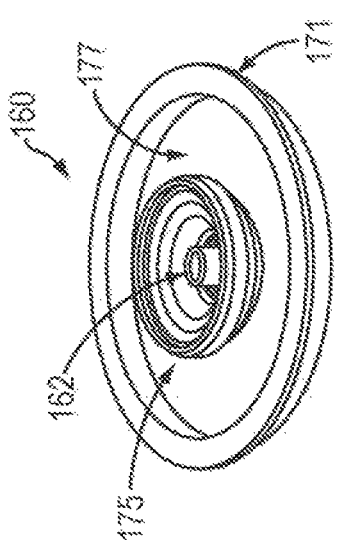
FIG. 4A is a perspective view of an atomization nozzle with a support flange according to an embodiment.
Figure 4D:
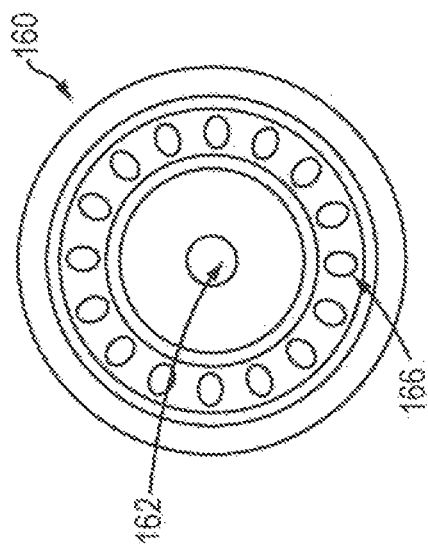
Figure 4C:
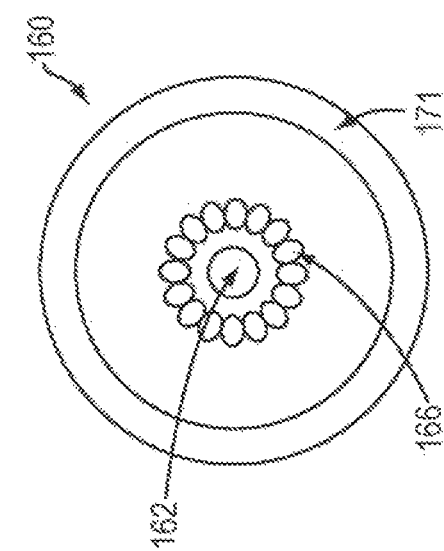

FIG. 4A is a perspective view of the atomization nozzle 160 with a support flange 171 according to an embodiment. FIG. 4B is a cross-sectional view of the atomization nozzle 160 and support flange 171 of FIG. 4A. FIGS. 4C, 4D and 4E are top, bottom and perspective views showing details of the atomization nozzle 160 of FIG. 4A, including the central aperture 162 surrounded by radial apertures 166 for forming plasma jet channels, for example micro-plasma jet channels. Without limitation, the atomization nozzle 160 may be formed of a water-cooled metal or of a radiation cooled refractory material or a combination of both.

The nozzle 160 is supported by the flange 171. As shown in FIGS. 2A and 2B, the flange 171 can be secured between the lower end of the plasma torch 120 and a mounting annular member 173 in a sealing arrangement between the plasma torch 120 and the cooling chamber 170. Still referring to FIGS. 2A and 2B, the nozzle 160 comprises an annular, inner surface 177 which may define a portion of the cooling channels 136 to provide at the same time for cooling of the nozzle 160. The nozzle 160 also defines an annular groove 175 to receive the lower end 211 of the plasma confinement tube 179 in a proper sealing arrangement.

The nozzle 160 of FIGS. 4A-4E comprises, on the inner side, a central tower 168 defining the central aperture 162, which is co-axial with the injection probe 122. The central aperture 162 has an input funnel-shaped enlargement 169. This configuration of the tower 168 facilitates alignment and insertion of the forward portion 112 of the feed material 110. The central aperture 162 of the nozzle 160 allows the forward portion 112 of the feed material 110 to exit the plasma torch 120 toward the inside of the cooling chamber 170.

The atomization nozzle 160 also comprises, around the central tower 168, a bottom wall formed with the plurality of radial apertures 166 equally, angularly spaced apart from each other. The radial apertures 166 are designed for allowing respective fractions of the plasma 126 to flow toward the cooling chamber 170 and generate the plasma jets 180. The number of radial apertures 166 and their angle of attack with respect to the central, geometrical longitudinal axis of the plasma torch 120 may be selected as a function of a desired distribution of the plasma jets 180 around the longitudinal axis of the plasma torch 120.

The central aperture 162 may be sized and configured to closely match a cross-section of the feed material 110 so that the central aperture 162 becomes substantially closed by insertion of the forward portion 112 of the feed material 110 therein. By closing the central aperture 162, a pressure of the plasma 126 in the plasma torch 120 builds up. This in turn causes respective fractions of the plasma 126 to be expelled from the zone 124 in the plasma confinement tube 179 via the radial apertures 166. These expelled fractions of the plasma 126 form the plasma jets 180. The radial apertures 166 are sized and configured to expel the plasma jets 180 at high velocity, which could possibly attain sonic or supersonic velocities.

In cases where the cross-section of the feed material 110 is smaller than the opening of the central aperture 162, the aperture 162 is not entirely blocked and pressure build-up within the plasma torch 120 may be of a lesser magnitude. Regardless, the sheer action of the plasma torch 120 and the partial blockage of the central aperture 162 by the feed material 110 still cause the plasma 126 to be at a significant pressure level. The plasma jets 180 may still be present, though potentially reduced in terms of flow and pressure. A portion of the plasma 126 is expelled through the central aperture 162, in a gap left between the feed material 110 and the opening of the central aperture 162. This portion of the plasma 126 forms an annular plasma jet, or flow, that surrounds the forward end 114 of the feed material 110. As it passes through the central aperture 162, the forward end 114 can be, in such cases, atomized in part by the annular plasma jet. The forward end 114 may further be atomized in a further part by plasma jets 180 that, though weaker, may still be expelled from the radial apertures 166 of the atomization nozzle 160 at a significant speed.

The radial apertures 166 may each be oriented so that the plasma jets 180 converge toward the forward end 114 of the feed material 110 in the form of an elongated member such as, as non-limitative examples, a wire, a rod or a filled tube, within the cooling chamber 170 to enhance the atomization process. More particularly, FIGS. 4C and 4D show, respectively, top and bottom views of the atomization nozzle 160. It may be observed that the radial apertures 166 are angled inwardly about the central, geometrical longitudinal axis of the plasma torch 120 from top to bottom of the atomization nozzle 162. In this manner, the plasma jets 180 formed therein will converge within the cooling chamber 170 toward a convergence point in axial alignment with the central aperture 162. Without limitation, the radial apertures 166 may be cylindrical and have a diameter in the range of 0.5 mm up to 3 mm to produce sonic or supersonic plasma micro-jets and may be oriented at 20° to 70° angles with respect to the central, geometrical longitudinal axis of the plasma torch 120. Other shapes and diameters of the radial apertures 166 may of course be contemplated.

As expressed hereinabove, the atomization nozzle 160 generates a plurality of converging plasma jets and may further generate an annular plasma jet. Another embodiment of the atomization nozzle that only generates an annular plasma jet will now be described.

Figure 5:
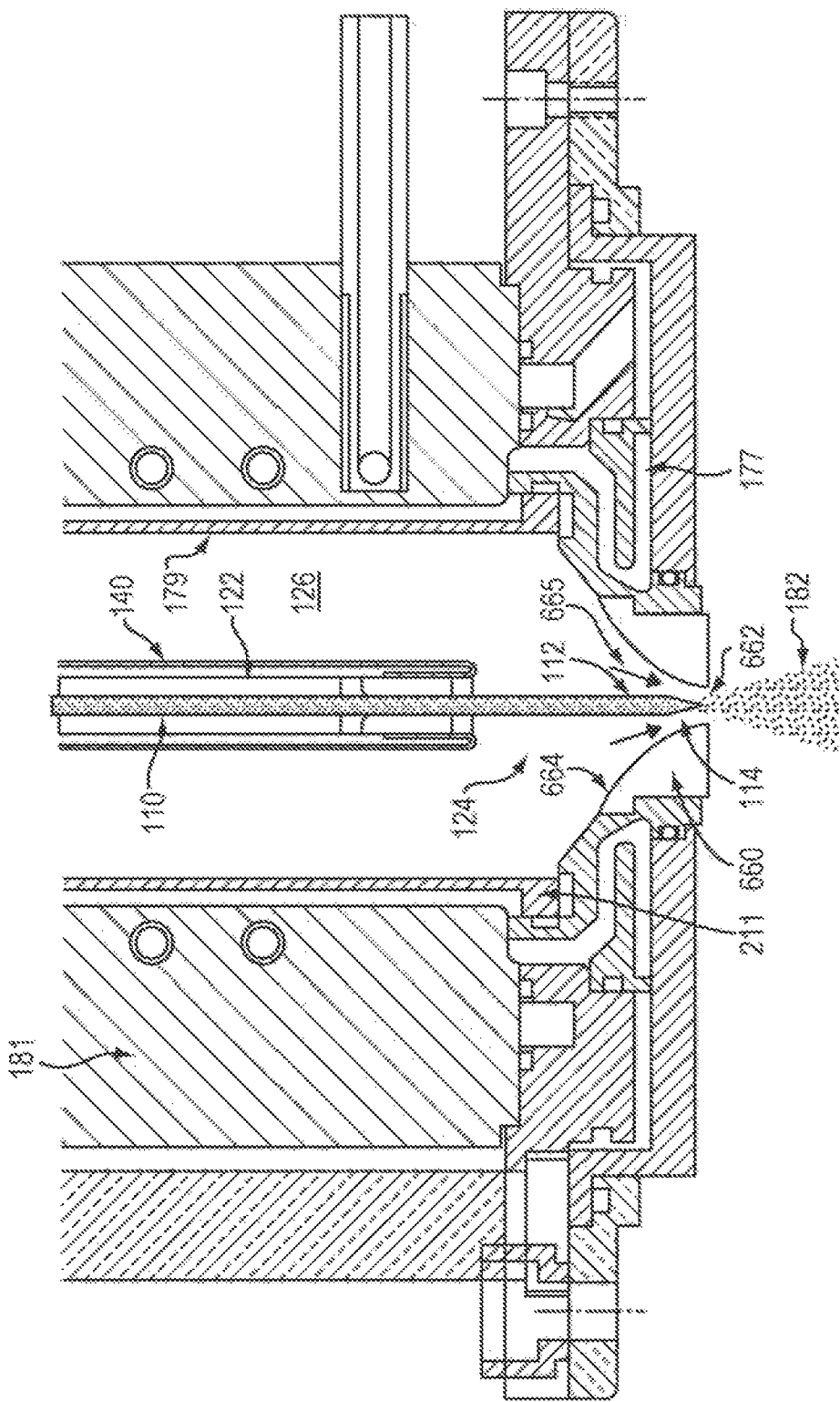
FIG. 5 is a detailed, front elevation view of the plasma torch of FIG. 1, showing an atomization nozzle according to another embodiment.

FIG. 5 is a detailed, front elevation view of the plasma torch of FIG. 1, showing an atomization nozzle according to another embodiment. In this embodiment, the plasma torch 120 is modified to comprise an atomization nozzle 660 arranged centrally on a bottom closure piece of the torch 120 secured to the lower end of the torch body 181. The atomization nozzle 660 has a central aperture 662 at its exit end and an internal face 664 that tapers off toward the central aperture 662. In a non-limitative embodiment, the central aperture 662 of the atomization nozzle 660 is sized and configured to substantially match a cross-section of the elongated member forming the feed material 110 so moving the forward end 114 of the feed material 110 into the atomization nozzle 660 causes building up of a pressure of the plasma 126 in the plasma torch 120. The pressure of the plasma 126 in the plasma torch 120 causes some of the plasma to be expelled through the atomization nozzle 660, forming an annular plasma jet 665 between the forward end 114 of the feed material 110 and the internal face 664 of the atomization nozzle 660. Exposure of the forward end 114 of the feed material 110 to the annular plasma jet 665 causes surface melting and atomization of the feed material 110. The atomized feed material exits the plasma torch 120 through the central aperture 662 and enters the cooling chamber 170 in the form of fine or ultrafine droplets 182. The droplets 182 fall into the cooling chamber 170, which is sized and configured to allow in-flight freezing of the droplets 182. The droplets 182, when freezing, turn into powder particles 184 collected in the collector 190. Some of the plasma, forming the annular plasma jet 665, also enters the cooling chamber 170.

Figure 6:
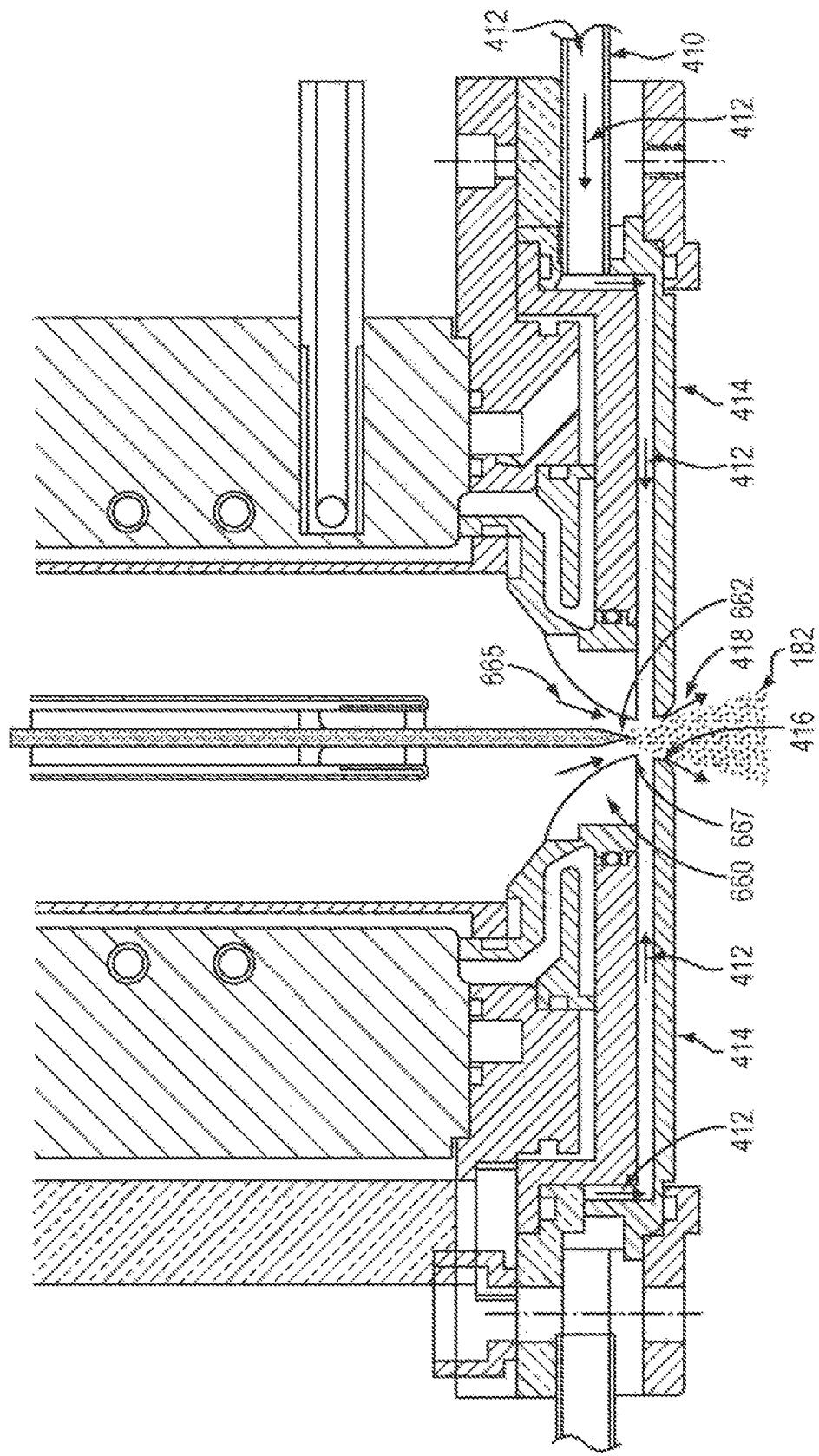
FIG. 6 is a detailed, front elevation view of a variant of the plasma torch of FIG. 1, showing the atomization nozzle of FIG. 5 and further including a sheath gas port surrounding the exit end of the atomization nozzle.
Figure 7:
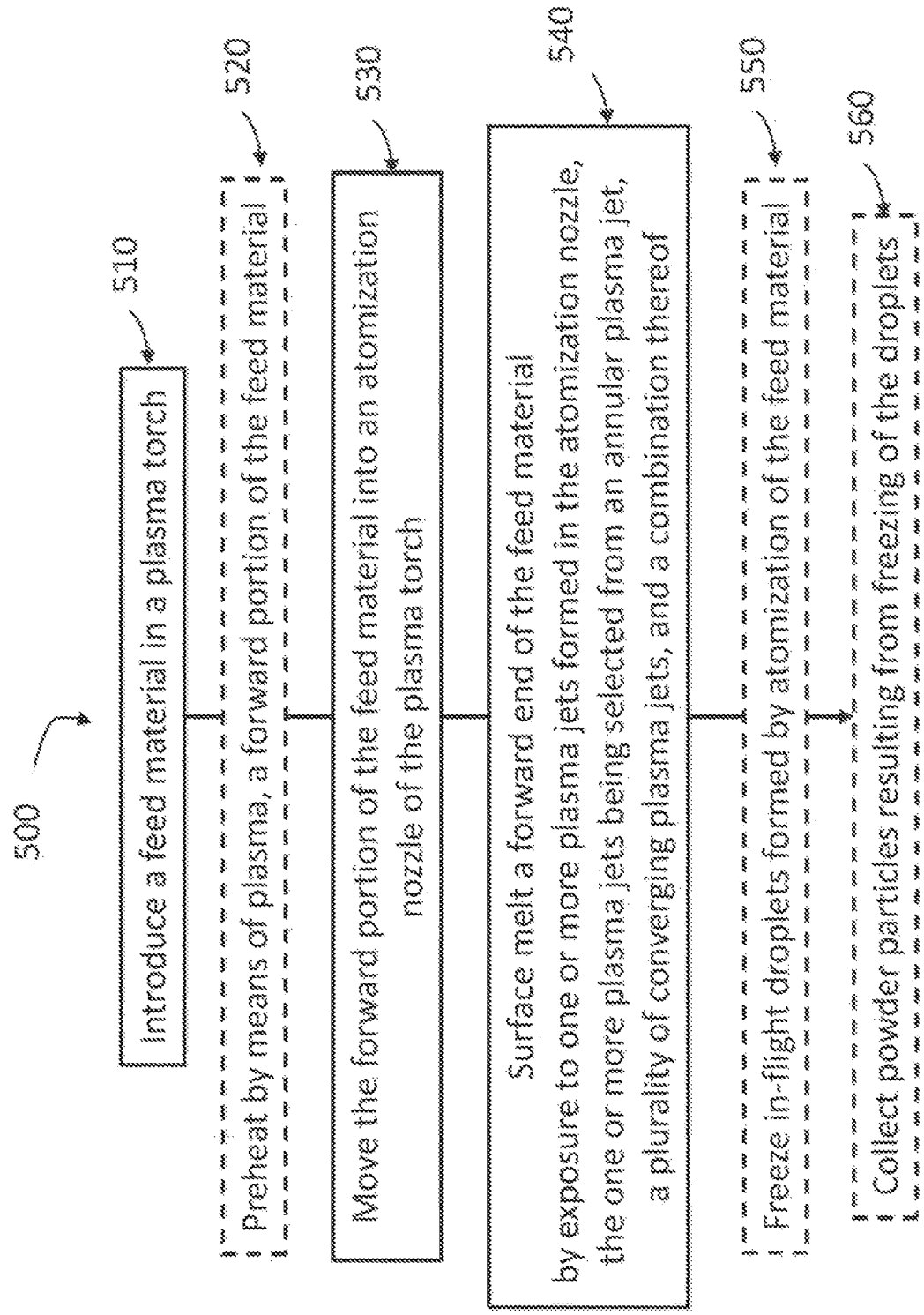
FIG. 7 is a flow chart showing operations of a process of producing powder particles by atomization of a feed material in the form of an elongated member such as, as non-limitative examples, a wire, rod or filled tube.

FIG. 6 is a detailed, front elevation view of a variant of the plasma torch of FIG. 1, showing the atomization nozzle of FIG. 5 and further including a sheath gas port surrounding the exit end of the atomization nozzle. In this variant, the plasma torch 120 of earlier Figures is supplemented by the addition of an input port 410 for receiving a sheath gas 412. The sheath gas 412 is constrained underneath the plasma torch 120 by a cover 414 that forms with the bottom closure piece of the torch an annular cavity surrounding the central aperture 662 of the atomization nozzle 660. The sheath gas 412 is expelled from the annular sheath gas output port 416 to form a sheath gas curtain 418 surrounding the plasma and the droplets 182 expelled from the atomization nozzle 660.

Presence of the axial sheath gas curtain 418 prevents the droplets 182 from reaching and depositing on any downstream surface of the plasma torch 120, including the atomization nozzle 660. Specifically, the sheath gas curtain 418 prevents rapid expansion of the plasma flow emerging from the atomization nozzle 660 and, therefore, the droplets 182 from impinging on any downstream surfaces of the cooling chamber. As shown on FIG. 6, the central aperture 662 of the atomization nozzle 660 may be extended slightly in a short annular flange 667 to better deflect the sheath gas 412 around the flow formed by the plasma gas and the droplets 182. The sheath gas may be of a same nature as the source of the plasma gas, including for example inert gases such as argon and helium to their mixtures with hydrogen, oxygen and/or nitrogen. The sheath gas may alternatively consist of a different gas.

The apparatus 100 may integrate either of the atomization nozzles 160 and 660. Though not illustrated, a further variant of the apparatus 100 including a combination of the atomization nozzle 160 with components providing the sheath gas 412 via the sheath gas port 416 is also contemplated, FIG. 7 is a flow chart showing operations of a process of producing powder particles by atomization of a feed material in the form of an elongated member such as, as non-limitative examples, a wire, rod or filled tube. On FIG. 7, a sequence 500 comprises a plurality of operations that may be executed in variable order, some of the operations possibly being executed concurrently, some of the operations being optional.

The sequence 500 for producing powder particles by atomization of a feed material in the form of an elongated member such as, as non-limitative examples, a wire, a rod or a filled tube is initiated at operation 510 by introducing the feed material in a plasma torch, for example in an inductively coupled plasma torch. Introduction of the feed material in the plasma torch may be made via an injection probe in continuous manner, using a typical wire, rod or tube feeding mechanism to control the feed rate of the elongated member and, if required, to straighten the elongated member sometimes provided in the form of rolls.

Within the plasma torch, a forward portion of the feed material may be preheated by either direct or indirect contact with plasma at operation 520. When an injection probe is used, a section of the plasma torch beyond an end of the injection probe, specifically between the end of the injection probe and may form a preheating zone for preheating the forward portion of the feed material. Operation 530 comprises moving a forward portion of the feed material from into an atomization nozzle of the plasma torch, a forward end of the feed material reaching a central aperture of the atomization nozzle.

One or more plasma jets are produced by the atomization nozzle. The one or more plasma jets may include an annular plasma jet surrounding the forward end of the feed material, a plurality of converging plasma jets expelled by the atomization nozzle, or a combination of the annular and converging plasma jets. Generating additional plasma jets using a secondary plasma torch operably connected to the cooling chamber is also contemplated. Operation 540 comprises surface melting the forward end of the feed material by exposure to the one or more plasma jets formed in the atomization nozzle.

Droplets formed by atomization of the feed material are frozen in-flight within the cooling chamber, at operation 550. Then operation 560 comprises collecting powder particles resulting from in-flight freezing of the droplets.

Production of the powder particles using the sequence 500 of FIG. 7 may be made continuous by continuously advancing the feed material into the plasma torch while maintaining the plasma and plasma jets at proper temperature levels. Generally, a duration of the travel of the forward portion of the feed material in the preheating zone, whether by direct contact between the feed material and the plasma or indirect radiation heating by the plasma through a radiation tube is controlled so that the forward portion of the feed material reaches a predetermined temperature before moving into the atomization nozzle. The predetermined temperature obtained in the preheating operation 520 is below a melting point of the feed material. Control of the duration of the preheating time of the feed material may be made by controlling a rate of feeding of the feed material and/or a length of the preheating zone in the plasma torch.

Through temperature control of the plasma and of the plasma jets, production of the powder particles using the sequence 500 may apply to a broad range of materials such as pure metals, for example titanium, aluminum, vanadium, molybdenum, copper, alloys of those or other metals including for example titanium alloys, steel and stainless steel, any other metallic materials having a liquid phase, ceramics including for example those of oxide, nitride, or carbide families, or any combination thereof, or any other ceramic material that has a liquid phase, composites or compounds thereof. The foregoing list of materials is not intended to limit the application of the process and apparatus for producing powder particles by atomization of a feed material in the form of an elongated member.

First Example

According to a first example, the process for producing powder particles by atomization of a feed material in the form of an elongated member may comprise the following operations. This first example may make use of the apparatus 100 illustrated in whole or in parts in FIG. 1-6 that includes the plasma torch 120 for heating, melting and atomizing the feed material 110. The process involves an axial introduction of the feed material 110 in the form of an elongated member such as, as non-limitative examples, a wire, a rod or a filled tube, through the injection probe 122, into the center of a discharge cavity where the plasma 126 is generated. The feed material 110 may be supplied to the injection probe 122 in continuous manner by a typical wire, rod or tube feeding mechanism (not shown) for example similar to commercially available units currently used in wire arc welding such as the units commercialized by Miller for MIG/Wire welding, and comprising, as indicated in the foregoing description, wheels operated to control the feed rate of the elongated member and, if required, to straighten the elongated member sometimes provided in the form of rolls. As the feed material 110 emerges from the injection probe 122 and traverses the plasma 126, it is heated in the preheating zone 124 before entering into the downstream atomization nozzle 160 at the lower end of the plasma torch 120. A distance between the end of the injection probe 122 and the entrance point of the atomization nozzle 160 defines a length of the preheating zone 124. A time of heating of the feed material 110 by the plasma in the preheating zone 124 depends on the length of the preheating zone 124 and on a linear speed at which the elongated member travels in the plasma torch 120. An amount of energy received by the feed material 110 in the preheating zone 124 depends in turn not only on the time of preheating of the feed material 110 in the preheating zone 126 but also on thermo-physical properties of the plasma 126 as well as on a diameter of the elongated member forming the feed material 110. Through control of the length of the preheating zone 124, the linear speed of the elongated member forming the feed material 110, and the plasma temperature, it is possible to control the temperature of the forward end 114 of the feed material 110 as it enters into the atomization nozzle 160. For optimal results, the temperature of the feed material 110, as it penetrates into the atomization nozzle 160, may be as high as possible, though preferably not too close to the melting point of the feed material 110 in order to avoid premature melting of the feed material 110 in the discharge cavity of the plasma torch 120.

As the preheated forward end 114 of the feed material 110 emerges from the atomization nozzle 160 in the cooling chamber 170, it is exposed to a plurality of plasma jets, for example a high velocity, sonic or supersonic, micro-plasma jets 180 that impinge on the surface of the forward end 114 of the elongated member forming the feed material 110, melts the material and, in statu nascendi, strips out molten material in the form of finely divided, spherical molten droplets 182 that are entrained by the plasma gas. As the atomized droplets 182 are transported further downstream into the cooling chamber 170, they cool down and freeze in-flight forming dense spherical powder particles 184 of the feed material. The powder particles 184 are recovered in the container 190 located at the bottom of the cooling chamber 170, or may be collected in a downstream cyclone (not shown) or collection filter (also not shown), depending on their particle size distribution.

Second Example

Again, this second example may make use of the apparatus 100 that includes the plasma torch 120 for heating, melting and atomizing the feed material 110. According to the second example usable to manufacture powders of dense spherical particles of metals, metal alloys and ceramics, the process for producing powder particles by atomization of a feed material in the form of an elongated member comprises the following operations:

a. An inductively coupled plasma source, for example an inductive plasma torch, comprising a fluid-cooled plasma confinement tube surrounded by a fluid-cooled induction coil is provided. The plasma is generated inside the plasma confinement tube through electromagnetic coupling of the energy from the induction coil into the discharge cavity in the plasma confinement tube. The inductively coupled plasma source operates typically, without limitation of generality, in a frequency range of 100 kHz to 10 MHz with a pressure ranging between soft vacuum of about 10 kPa up to 1.0 MPa. The plasma gases can range from inert gases such as argon and helium to their mixtures with hydrogen, oxygen and/or nitrogen. The inductively coupled plasma source comprises a head responsible for the distribution of a cooling fluid, such as water, that provides efficient cooling of all its components. The head may further provide a uniform distribution of a plasma sheath gas into the discharge cavity in order to stabilize the discharge at the center of the tube. The plasma sheath gas also protects the plasma confinement tube from high heat fluxes emanating from the plasma discharge. On a downstream end of the inductively coupled plasma source, an exit flange-mounted nozzle allows the plasma to flow towards a cooling chamber. The inductively coupled plasma source may also be equipped with a centrally located, water-cooled, material injection probe that serves to introduce the material to be processed into the discharge cavity.

b. The feed material to be atomized is introduced through the injection probe in the form of an elongated member such as, as non-limitative examples, a wire, a rod or a filled tube, in a well-controlled feed rate, using an appropriate feeding mechanism. The feed material may be supplied to the injection probe in continuous manner by a typical wire, rod or tube feeding mechanism (not shown) for example similar to commercially available units currently used in wire arc welding such as the units commercialized by Miller for MIG/Wire welding, and comprising wheels operated to control the feed rate of the elongated member and, if required to straighten the elongated member sometimes provided in the form of rolls.

c. As the feed material to be processed emerges from the injection probe, it is directed towards a central aperture in an atomization nozzle. The presence of the feed material closes at least in part this central aperture of the atomization nozzle.

d. Closing at least in part of the nozzle central aperture causes a pressure of the plasma in the discharge cavity to build-up. The pressure may be in a range of 50 kPa up to 500 kPa or more. This pressure causes a flow of plasma through a plurality of radial apertures in the atomization nozzle, the radial apertures being uniformly distributed over a circular perimeter surrounding the central aperture of the nozzle. This result in the creation of a plurality of focused plasma micro-jets having a very high speed, possibly reaching sonic or supersonic values, depending on the configuration and operational parameters.

e. Exposure of the forward end of the elongated member forming the feed material exits central aperture of the atomization nozzle to penetrate a cooling chamber, it is subjected to intense heating by the plasma jets. This completes the melting of the feed material at its surface and atomizes it in the form of fine or ultrafine molten droplets. With this second example, droplets having diameters in the range of 5 µm to few hundred micrometers may be obtained.

f. As the atomized material is entrained in the cooling chamber by the emerging plasma gas, the molten droplets cool down and solidify in-flight, forming dense spherical particles that are collected at the downstream part of the system.

Third Example

According to a third example, which may make use of the apparatus 100, the process for producing powder particles by atomization of a feed material in the form of an elongated member comprises the following operations.

Feed material 110 in the form of an elongated member such as, as non-limitative examples, a wire, a rod or a filled tube is introduced through the injection probe 122 axially oriented along a centerline of the plasma torch 120.

As the feed material 110 emerges from the injection probe 122, at a downstream end of the plasma torch 120, its forward portion 112 is heated either by direct contact with the plasma 126 or indirectly using the radiation tube 125 in the preheating zone 124. A distance of travel in the preheating zone 124 and a speed of movement of the feed material 110 may be adjusted to allow sufficient time for the forward portion 112 of the elongated member to heat to a temperature as close as possible to the melting point of the feed material, without actually reaching that melting point.

At this point, the forward end 114, or tip, of the feed material 110 reaches the atomization nozzle 160 and penetrates through its central aperture 162, which in this third example has substantially the same diameter as that of the elongated member. As the forward end 114 of the feed material 110 emerges in the cooling chamber 170 from a downstream side of the atomization nozzle 160, it is exposed to the plurality of plasma jets 180, for example the high-velocity plasma micro-jets 180 impinging thereon. Since the forward end of the feed material 110, being already preheated in the preheating zone 124, i.e. in the discharge cavity, to near its melting point, it rapidly melts at its surface and is stripped away by the plasma jets 180, turning into fine or ultrafine droplets 182 that are entrained by a plasma flow resulting from the plasma jets 180. As the droplets 182 travel down the cooling chamber 170, they cool down and solidify in the form of dense spherical particles 184 that deposits by gravity in the container 190 at the bottom of the cooling chamber 170 or are transported by the plasma gas to a downstream powder collection cyclone or to a fine metallic fitter.

Fourth Example

According to a fourth example, which may make use of the apparatus 100, the process for producing powder particles by atomization of a feed material in the form of an elongated member comprises the following operations.

Feed material 110 in the form of an elongated member such as, as non-limitative examples, a wire, a rod or a filled tube has smaller diameter than that of the central aperture 162. The feed material 110 is introduced through the injection probe 122 axially oriented along a centerline of the plasma torch 120.

As in the third example, the feed material 110 emerges from the injection probe 122, at a downstream end of the plasma torch 120, its forward portion 112 is heated either by direct contact with the plasma 126 or indirectly using the radiation tube 125 in the preheating zone 124. A distance of travel in the preheating zone 124 and a speed of movement of the feed material 110 may be adjusted to allow sufficient time for the forward portion 112 of the elongated member to heat to a temperature as close as possible to the melting point of the feed material, without actually reaching that melting point.

At this point, the forward end 114, or tip, of the feed material 110 reaches the atomization nozzle 160 and penetrates through its central aperture 162, which in this fourth example has a larger diameter than that of the elongated member. As the forward end 114 of the feed material 110 travels through the central aperture 162 of the atomization nozzle 160, it is exposed to an annular plasma jet present in a gap formed of a difference between the diameter of the central aperture 162 and the diameter of the elongated member. Since the forward end 114 of the feed material 110, is already preheated in the preheating zone 124, i.e. in the discharge cavity, to near its melting point, exposition of the forward end 114 of the feed material 110 to this annular plasma jet causes a rapid melting at its surface, being stripped away by the annular plasma jet, turning into fine or ultrafine droplets 182 that are entrained by a plasma flow resulting from the annular plasma jet. If the forward end 114 is not entirely atomized by the annular plasma jet, remaining feed material emerges in the cooling chamber 170 from a downstream side of the atomization nozzle 160. The remaining feed material is exposed to the plurality of plasma jets 180 impinging thereon. The remaining feed material continues melting at its surface and, being stripped away by the plasma jets 180, turning into more fine or ultrafine droplets 182 that are entrained by a plasma flow resulting from the annular plasma jet and from the plasma jets 180. As the droplets 182 travel down the cooling chamber 170, they cool down and solidify in the form of dense spherical particles 184 that deposits by gravity in the container 190 at the bottom of the cooling chamber 170 or are transported by the plasma gas to a downstream powder collection cyclone or to a fine metallic filter.

An overall view of a typical plasma atomization apparatus 100 is shown in FIG. 3. The basic dimensions and shapes of the shown components of the apparatus 100 may widely vary depending on the material to be atomized and depending on desired production rates. A power level of the plasma torch 120 may, without loss of generality, vary between 10 or 20 kW up to hundreds of kW for a commercial production scale unit.

Referring again to FIGS. 4A-4E, an example of design of the atomization nozzle 160 is shown. The nozzle 160 comprises the flange 171. The atomization nozzle 160 may be made of fluid-cooled copper or stainless steel. Alternatively, the atomization nozzle 160 may be made of a refractory material such as graphite, in combination with a water-cooled flange 171.

The atomization nozzle 160 has a central aperture 162 optionally adapted to closely match a diameter of the elongated member forming the feed material 110. The atomization nozzle 160 has a plurality of radial apertures 166 equally distributed around the central aperture 162 and which, according to an embodiment, are directed at an angle of 45° about the central, geometrical longitudinal axis of the plasma torch 120. Successful operation was obtained using sixteen (16) radial apertures 166 having a diameter of 1.6 mm, the radial apertures 166 being equally distributed around the central aperture 162. The diameter, the number and the angle of the radial apertures 166 can be adjusted depending on thermo physical properties of the materials to be atomized and on a desired particle size distribution.

It should be pointed out that the atomized material may change its chemical composition during atomization through the reaction between different components premixed into the feed material. A non-limitative example is the production of an alloy by mixing different metals forming the particles filling a tube forming the feed material. Another non-limitative example is a chemical reaction between the chemical components forming the particles in the filled tube. It should also be pointed out that the atomized material may change its chemical composition during atomization as a result of a chemical reaction between the plasma gas(es) and/or sheath gas(es) and the atomized material, for example by oxidation, nitration, carburization, etc.

Figure 8:
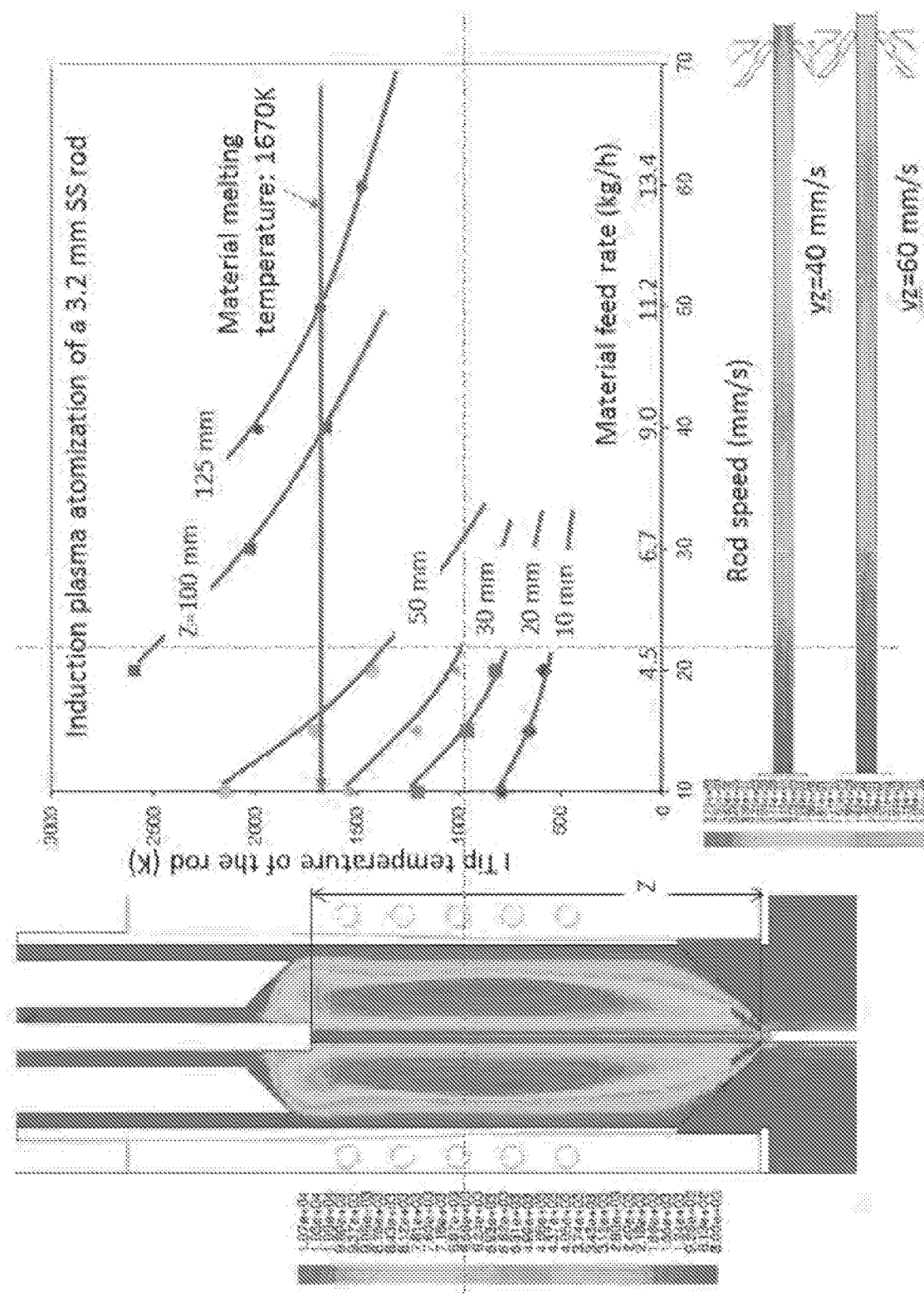
FIG. 8 is a schematic view, including a graph showing modelling results for heating a 3.2 mm stainless steel wire introduced in an argon/hydrogen induction plasma at 60 kW.

Based on fluid dynamic modeling of the flow and temperature field in the discharge cavity of the plasma torch it is possible to calculate the temperature profile in the elongated member forming the feed material as it traverses the preheating zone in the torch. FIG. 8 is a schematic view, including a graph showing modelling results for heating a 3.2 mm stainless steel wire introduced in an argon/hydrogen induction plasma at 60 kW. FIG. 8 provides typical results that can be obtained using an inductively coupled plasma torch as shown on FIGS. 1-6. FIG. 8 shows, on its left hand side a two-dimensional temperature field in the discharge cavity for the argon/hydrogen plasma operated with a radio frequency power supply with an oscillator frequency of 3 MHz, and a plate power of 60 kW. At the bottom of FIG. 8, a corresponding temperature field in a 3.2 mm diameter stainless steel rod is given for rod translation velocities of 40 and 60 mm/s. As expected the overall temperature of the rod drops with the increase of its translation speed across the preheating zone in the discharge cavity of the plasma torch. The center of FIG. 8 is a graph showing a variation of the maximum temperature achieved at the tip of the elongated member, for different speeds, and different length of the preheating zone 124, identified on the left hand side of FIG. 8 as 'z'. It may be noted that depending on the length of the preheating zone 124, maintaining the rod translation velocity within a relatively narrow window allows to avoid the premature melting of the material in the discharge cavity or its arrival at the atomization nozzle at too low a temperature, which would have a negative impact on the quality of the atomized product.

Figure 9:
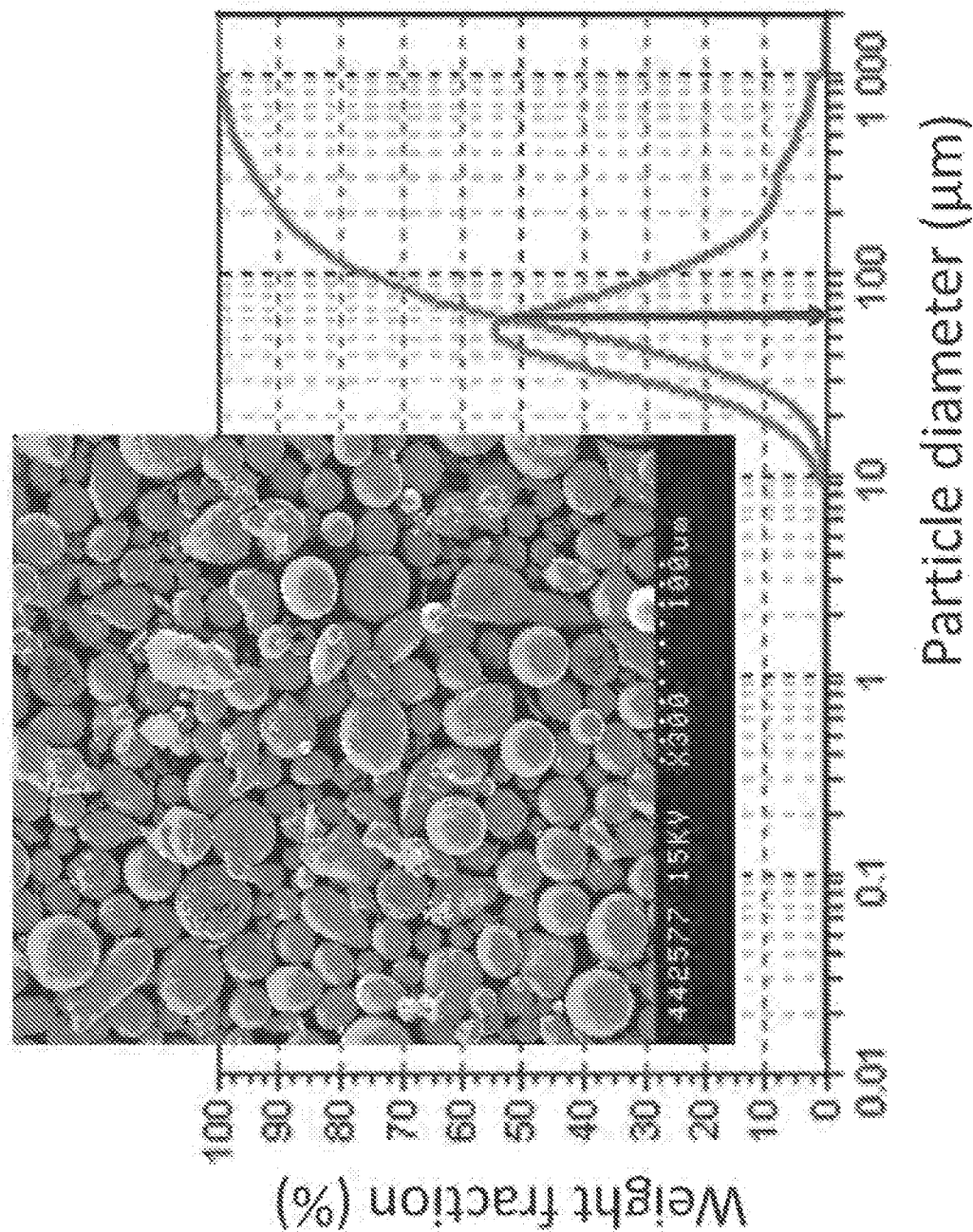
FIG. 9 is an electron micrograph of powder particles obtained by atomization of a 3.2 mm diameter stainless steel wire and a graph of corresponding particle size distribution.

FIG. 9 is an electron micrograph of powder particles obtained by atomization of a 3.2 mm diameter stainless steel wire and a graph of corresponding particle size distribution. Such particles can be obtained using the plasma torch of FIGS. 1-6. Stainless steel powder particles were obtained using the induction plasma atomization process. The powder particles had a mean particle diameter, $d_{50}$ of about 62 μm and the powder production rate was about 1.7 kg/hour. The powder was mostly composed of dense spherical particles. A certain number of splats and satellites were observed depending on the operating conditions and process optimization.

Figure 10:
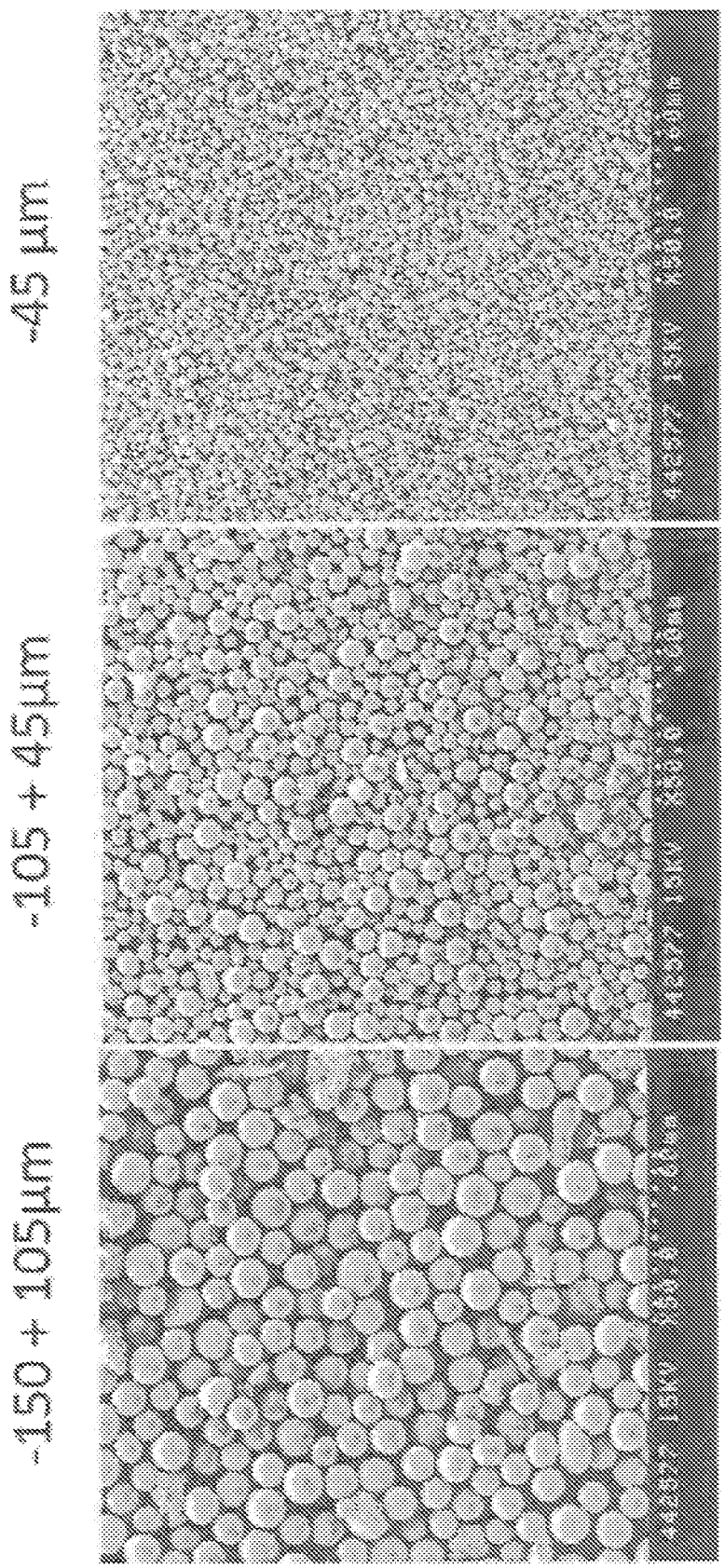
FIG. 10 illustrates electron micrographs of different stainless steel spherical powder fractions produced using the process and apparatus for producing powder particles by atomization of a feed material in the form of an elongated member.

FIG. 10 illustrates electron micrographs of different stainless steel spherical powder fractions produced using the process and apparatus for producing powder particles by atomization of a feed material in the form of an elongated member. Such particles can be obtained using the inductively coupled plasma torch of FIGS. 1, 2A and 2B. Again, the powder was mostly composed of dense spherical particles; only few splats and satellites were observed depending on the operating conditions and process optimization.

Those of ordinary skill in the art will realize that the description of the process and apparatus for producing powder particles and the description of powder particles so produced are illustrative only and are not intended to be in any way limiting. Other embodiments will readily suggest themselves to such persons with ordinary skill in the art having the benefit of the present disclosure. Furthermore, the disclosed process, apparatus and powder particles may be customized to offer valuable solutions to existing needs and problems related to efficiently and economically producing powder particles from a broad range of feed materials.

Various embodiments of the process for producing powder particles by atomization of a feed material in the form of an elongated member, of the apparatus therefor, and of the powder particles so produced, as disclosed herein, may be envisioned. Such embodiments may comprise a process for the production of a broad range of powders including, tough not limited to, fine and ultrafine powders of high purity metals, alloys and ceramics in an efficient cost effective way that is scalable to an industrial production level. The process is applicable for the production of powders of pure metals, alloys and ceramics, causes minimal or no contamination of the atomized material, causes minimal or no oxygen pickup especially for reactive metals and alloys, produces fine or ultrafine particle size, for example with particle diameter less than 250 μm, the particles being dense and spherical, with minimal or no contamination with satellites.

In the interest of clarity, not all of the routine features of the implementations of process, apparatus, and use thereof to produce powder particles are shown and described. It will, of course, be appreciated that in the development of any such actual implementation of the process, apparatus, and use thereof to produce powder particles, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of materials processing having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An apparatus for producing powder particles by atomization of a solid wire material, comprising:
   a. a feeding mechanism configured to progressively uncoil a roll of the solid wire material and feed the uncoiled solid wire material toward an atomization zone along a feed path;
   b. means to produce a plasma jet into the atomization zone impinging upon the solid wire material at an impingement point for causing progressive melting of the solid wire material and breakdown of the solid wire material into molten droplets;
   c. a cooling zone receiving the molten droplets to solidify the molten droplets into the powder particles; and
   d. an injection probe for feeding the solid wire material toward the impingement point, the injection probe defining an elongated channel for receiving the solid wire material, the channel extending along the feed path, the injection probe including cooling means, the cooling means including a passageway for a cooling fluid.

2. The apparatus of claim 1, including means to pre-heat the solid wire material while the solid wire material advances along the feed path and before the solid wire material reaches the impingement point, the means to pre-heat being configured to elevate a temperature of the solid wire material to a selected temperature which is below the melting point of the solid wire material.

3. The apparatus of claim 2, wherein the means to pre-heat the solid wire material comprises an induction coil in a substantially co-axial arrangement with the feed path such that the solid wire material is fed through the induction coil as the solid wire material advances along the feed path, the induction coil configured to supply energy to heat the solid wire material.

4. The apparatus of claim 3, wherein the injection probe is co-axial with the induction coil.

5. The apparatus of claim 2, wherein the means to pre-heat the solid wire material includes a radiation structure which is substantially co-axial with the injection probe, wherein the solid wire material passes through the radiation structure as the solid wire material advances along the feed path, the means to pre-heat the solid wire material including a heat source to heat the radiation structure which is configured in turn to heat the solid wire material through radiation while the solid wire material is travelling through the radiation structure.

6. The apparatus of claim 5, wherein the heat source includes means to generate plasma adjacent the radiation structure, wherein the plasma heats the radiation structure.

7. The apparatus of claim 2, wherein the feeding mechanism is further configured to control a linear speed of the solid wire material along the feed path through the means to pre-heat the solid wire material in dependence of the selected temperature.

8. The apparatus of claim 1, wherein the means to produce the plasma jet is configured to produce a plurality of plasma jets converging at the impingement point.

9. The apparatus of claim 1, wherein the channel has an exit end, the impingement point residing downstream the exit end in a direction of travel of the solid wire material along the feed path.

10. The apparatus of claim 1, wherein the passageway includes an inlet.

11. The apparatus of claim 1, wherein the passageway includes an outlet.

12. The apparatus of claim 1, configured for feeding the solid wire material at a feed rate of between 2.3 kg/hour and 15.5 kg/hour at the atomization zone.

13. The apparatus of claim 1, configured for producing the powder particles at a rate of at least 1.7 kg/hour.

14. The apparatus of claim 1, wherein the feeding mechanism is configured for feeding the solid wire material at a linear speed of between 40 mm/s and 60 mm/s.

15. The apparatus of claim 1, wherein the solid wire material comprises a pure metal, an alloy, a ceramic, or a composite material.

16. The apparatus of claim 1, wherein the plasma is generated from a gas comprising argon, helium, or a combination thereof.

17. The apparatus of claim 1, further comprising a powder collector configured such that the powder particles are collected from the cooling zone into the powder collector by gravity.

18. The apparatus of claim 17, wherein the powder collector resides below the cooling zone.

19. The apparatus of claim 1, further comprising a powder collector configured such that the powder particles are collected from the cooling zone into the powder collector, wherein the apparatus is configured such that the powder particles travel from the cooling zone toward the powder collector along a direction other than a vertical direction.

20. The apparatus of claim 19, wherein the powder collector is in fluid communication with the cooling zone by a conduit through which the powder particles travel from the cooling zone toward the powder collector.

21. The apparatus of claim 20, wherein the apparatus is configured to transport the powder particles through the conduit by creating a flow of a gaseous medium through the conduit.

22. The apparatus of claim 1, further comprising a powder collector configured such that the powder particles are collected from the cooling zone into the powder collector, the powder collector including a cyclone.

23. The apparatus of claim 22, wherein the cyclone is configured to separate the powder particles into two or more fractions according to size.

* * * * *